US009401512B2

(12) United States Patent
Vincent et al.

(10) Patent No.: US 9,401,512 B2
(45) Date of Patent: Jul. 26, 2016

(54) METHOD FOR MANUFACTURING AN ELECTRODE/PROTON-EXCHANGE MEMBRANE ASSEMBLY

(71) Applicant: Commissariat à l'énergie atomique et aux énergies alternatives, Paris (FR)

(72) Inventors: Rémi Vincent, Grenoble (FR); Benoît Barthe, Chindrieux (FR); Denis Tremblay, Pommiers-la-Placette (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 23 days.

(21) Appl. No.: 14/411,681

(22) PCT Filed: Jun. 28, 2013

(86) PCT No.: PCT/EP2013/063648
§ 371 (c)(1),
(2) Date: Dec. 29, 2014

(87) PCT Pub. No.: WO2014/001510
PCT Pub. Date: Jan. 3, 2014

(65) Prior Publication Data
US 2015/0180044 A1 Jun. 25, 2015

(30) Foreign Application Priority Data
Jun. 29, 2012 (FR) .................... 12 56227

(51) Int. Cl.
*H01M 4/88* (2006.01)
*B32B 38/10* (2006.01)
(Continued)

(52) U.S. Cl.
CPC ............. *H01M 4/8878* (2013.01); *B32B 37/06* (2013.01); *B32B 37/10* (2013.01); *B32B 37/24* (2013.01); *B32B 38/10* (2013.01); *C25B 9/10* (2013.01); *H01M 4/8803* (2013.01);
(Continued)

(58) Field of Classification Search
CPC ..................... B32B 2457/18; B32B 2037/243; B32B 2255/20; B32B 2305/026; B32B 2307/202; B32B 2307/724; B32B 37/06; B32B 37/24; B32B 37/01; B32B 37/24; B32B 38/10; H01M 4/8807; H01M 4/8878; H01M 8/1004; H01M 4/8803; H01M 4/8814; H01M 4/8828; H01M 8/0273; Y02E 60/521; Y02P 70/56; C25B 9/10
USPC ......................................................... 156/247
See application file for complete search history.

(56) References Cited

U.S. PATENT DOCUMENTS 6,524,736 B1  2/2003  Sompalli et al.
2003/0121603 A1  7/2003  Oh et al.
(Continued)

FOREIGN PATENT DOCUMENTS

JP  2010129435  6/2010
JP  2010129435 A  *  6/2010

*Primary Examiner* — Philip Tucker
*Assistant Examiner* — Vicki Wu
(74) *Attorney, Agent, or Firm* — Occhiuti & Rohlicek LLP

(57) ABSTRACT

A method for manufacturing a membrane/electrode assembly, including depositing an electrocatalyst ink on one face of a support so as to form an electrode on the support and fixedly attaching the support and the electrode formed on a proton-exchange membrane by adhesion. The method also includes withdrawing a part of the support so as to uncover at least one median part of the formed electrode.

14 Claims, 2 Drawing Sheets

(51) Int. Cl.

| | | |
|---|---|---|
| *B32B 37/24* | (2006.01) | |
| *B32B 37/10* | (2006.01) | |
| *B32B 37/06* | (2006.01) | |
| *C25B 9/10* | (2006.01) | |
| *H01M 8/10* | (2016.01) | |
| *H01M 8/02* | (2016.01) | |

(52) U.S. Cl.
CPC ......... *H01M 4/8807* (2013.01); *H01M 4/8814* (2013.01); *H01M 4/8828* (2013.01); *H01M 8/0273* (2013.01); *H01M 8/1004* (2013.01); *B32B 2037/243* (2013.01); *B32B 2255/20* (2013.01); *B32B 2305/026* (2013.01); *B32B 2307/202* (2013.01); *B32B 2307/724* (2013.01); *B32B 2457/18* (2013.01); *Y02E 60/521* (2013.01); *Y02P 70/56* (2015.11)

(56) References Cited

U.S. PATENT DOCUMENTS

| | | | |
|---|---|---|---|
| 2008/0105354 | A1 | 5/2008 | James et al. |
| 2008/0292931 | A1* | 11/2008 | Schwartz ............ H01M 4/8605 429/524 |
| 2009/0208805 | A1* | 8/2009 | Wakabayashi ........ B29C 66/472 429/429 |
| 2010/0129435 | A1 | 5/2010 | Wheeler et al. |

* cited by examiner

METHOD FOR MANUFACTURING AN ELECTRODE/PROTON-EXCHANGE MEMBRANE ASSEMBLY

RELATED APPLICATIONS

This application is a U.S. National Stage of international application number PCT/EP2013/063648 filed Jun. 28, 2013, which claims the benefit of the priority date of French Patent Application FR 1256227, filed Jun. 29, 2012, the contents of which are herein incorporated by reference.

FIELD OF INVENTION

The invention pertains to proton-exchange membranes (called PEMs) and especially to methods for manufacturing such membranes. Proton-exchange membranes are used especially in electrolyzers and in fuel cells.

BACKGROUND

Fuel cells are envisaged as a system of electrical power supply for future mass-produced motor vehicles, as well as for a great number of applications. A fuel cell is an electrochemical device that converts chemical energy directly into electrical energy. Hydrogen (H2) or molecular hydrogen is used as a motor fuel for the fuel cell. Hydrogen (H2) or molecular hydrogen is oxidized and ionized on an electrode of the cell and oxygen (O2) or molecular oxygen in the air is reduced on another electrode of the cell. The chemical reaction produces water at the cathode, oxygen being reduced and reacting with the protons. The great advantage of the fuel cell is that it averts the release of atmosphere-polluting compounds at the place where the electricity is generated.

Proton-exchange membrane (PEM) fuel cells have particularly interesting properties of compactness. Each cell unit of the fuel cell comprises an electrolytic membrane enabling only the passage of protons and not the passage of electrons. The membrane comprises an anode on a first face and a cathode on a second face to form a membrane/electrode assembly known as an MEA.

At the anode, molecular hydrogen is ionized to produce protons passing through the membrane. The electrons produced by this reaction migrate to a flow plate and then pass through an electrical circuit external to the cell unit to form an electrical current.

The fuel cell can comprise several flow plates, for example made of metal, stacked on one another. The membrane is positioned between two flow plates. The flow plates can include channels and holes to guide the reactants and the products to and from the membrane. The plates are also electrically conductive to form collectors of the electrons generated at the anode. Gas diffusion layers are interposed between the electrodes and the flow plates and are in contact with the flow plates.

The most widespread method for producing hydrogen from water consists in using the principle of electrolysis. To apply such methods, electrolyzers provided with a proton-exchange membrane are known. In such an electrolyzer, an anode and a cathode are fixed on either side of the proton-exchange membrane (to form the membrane/electrode assembly) and are put into contact with water. A difference in potential is applied between the anode and the cathode. Thus, oxygen is produced at the anode by oxidation of the water. The oxidation at the anode also generates $H^+$ ions that pass through the proton-exchange membrane up to the cathode and electrons are sent back to the cathode by the electrical power supply. At the cathode, the $H^+$ ions are reduced to generate molecular hydrogen.

In practice, such an electrolyzer generally comprises power supply plates positioned on either side of the membrane/electrode assembly. Current collectors are disposed between the power supply plates and the membrane/electrode assembly.

Such an electrolysis device has undesirable effects. One of the challenges entailed by such a proton-exchange membrane electrolyzer is that of augmenting its efficiency, increasing its service life, reducing its manufacturing cost and ensuring a high level of security. The challenges are identical for a proton-exchange membrane fuel cell. These parameters are highly dependent on the method for manufacturing electrodes.

According to a first type of method for manufacturing a membrane/electrode assembly, catalyst ink is deposited in layers on the gas diffusion layers. After this ink has been dried, the membrane/electrode assembly is made by hot pressing. Hot pressing optimizes the contact between an electrode and the membrane in order to reduce their contact resistance to the maximum and thus optimize the performance of the MEA.

The hot-pressing operation unfortunately causes a deterioration of the membrane and notably affects the service life of the MEA. Owing to the great roughness of the gas diffusion layers, considerable pressure has to be applied during the hot-pressing process. Such pressure also greatly affects the porosity of the gas diffusion layers and therefore the performance of the device including the MEA.

To resolve some of these drawbacks, a second type of manufacturing method proposes to directly deposit electrocatalyst ink on the proton-exchange membrane so as to form an electrode-forming layer.

Such a method causes deformation by wet expansion or hydro-expansion of the membrane during the deposition of the ink. The method then gives rise to a deformation of the membrane by retraction under drying. This deformation is non-negligible and causes mechanical stresses at the deposits which may lead to cracks in the electroactive layer formed. Such cracks reduce the electron percolation of the electrode and thus reduce its electrical conductivity. In addition, the cracks may alter the cohesion between the electrode and the membrane. Thus, a non-negligible part of the electrode can become non-functional.

Besides, during operation, the membrane is totally submerged in water, giving it a maximum expansion rate. The mechanical stresses at the interface between the electrode and the membrane are thus the maximum, causing increased deterioration of the electrode. This deterioration of the electrode reduces the energy efficiency of the electrolyzer as well as its service life.

Another problem of the formation of an electrode by catalytic deposition on the membrane is the damage to this membrane by the solvents (for example ethanol or isopropanol) present in ink. Secondly, the solvents cause an increase in the permeability of the membrane to gases. A part of the gases produced at the anode and at the cathode thus passes through the proton-exchange membrane by diffusion. This causes firstly problems of purity of the gases produced but also problems of security. The proportion of hydrogen in the oxygen must especially remain absolutely below 4%, such a proportion being the lower limit of explosiveness of hydrogen in oxygen. Besides, the damage to the membrane by the solvents reduces its service life.

A third method of manufacture of the membrane/electrode assembly gives an optimal compromise between the performance of the MEA and its service life. This method comprises a preliminary step for printing the electrocatalyst layer on a smooth and hydrophobic support, insensitive to the solvents present in the ink. The printing support especially has a very low surface energy and a very low roughness. After the formation of the electrode by drying of the catalyst ink, the electrode is assembled with the membrane by hot pressing. Because of the low adhesion of the electrode to the printing support, this hot pressing can be done at low temperature and pressure. The deterioration of the membrane during the hot-pressing step is thus reduced. In addition, the electrode formed by printing on a smooth support has a homogenous thickness and composition, thus also limiting deterioration of the membrane during the hot pressing. In addition, since the electrode is assembled on the membrane after drying, the membrane is not put into contact with the ink solvents and undergoes no corresponding deterioration.

The document US2008/0105354 describes such a method of membrane/electrode assembly for a fuel cell. The membrane/electrode assembly formed has reinforcements or sub-gaskets. Each reinforcement surrounds the electrodes. The reinforcements are made out of polymer films and reinforce the membrane/electrode assembly at the inlets of gas and of cooling liquid. The reinforcements facilitate the handling of the membrane/electrode assembly to prevent its deterioration. The reinforcements also limit the dimensional variations of the membrane according to temperature and humidity. In practice, the reinforcements are superimposed on the periphery of the electrodes in order to limit the phenomenon of permeation of gas which is the cause of a deterioration of the membrane/electrode assembly.

According to this method, a reinforcement is made by forming an aperture in the median part of a polymer film. The reinforcement comprises a pressure-sensitive adhesive on one face. A membrane/electrode assembly is recovered and the aperture of the reinforcement is placed plumb with an electrode. The reinforcement covers the periphery of this electrode. A pressing operation is then carried out to fixedly attach the reinforcement to the membrane and to the border of the electrode by means of adhesive. As a variant, a reinforcement without adhesive can be fixedly attached to the membrane during the hot-pressing step, using a pressing temperature greater than the glass transition temperature of the membrane. The gas and liquid inlets are then cut out of the reinforcement.

Owing to the excess thickness between the electrode and the reinforcement, the pressure and the temperature must be increased when the assembling is done, to the detriment of the service life of the membrane. Besides, the method of manufacture remains relatively complex and increases the number of steps that could cause a malfunctioning in the membrane/electrode assembly.

The document JP2010 129435 A describes a method for manufacturing a membrane/electrode assembly with steps of hot adhesion between a proton-exchange membrane and a mask in the shape of a frame comprising two layers of deposit of an electrocatalyst ink on the membrane through the aperture of the mask and of withdrawal of a layer forming the mask.

This method leads to deterioration of the membrane and/or of the electrodes during its execution.

SUMMARY

The invention seeks to resolve one or more of these drawbacks. The invention thus relates to a method for manufacturing a membrane/electrode assembly as defined in the appended claims.

Other advantages and characteristics of the invention shall appear more clearly from the following description, given by way of an indication that is in no way restrictive, with reference to the appended drawings.

DETAILED DESCRIPTION

Figure 1:
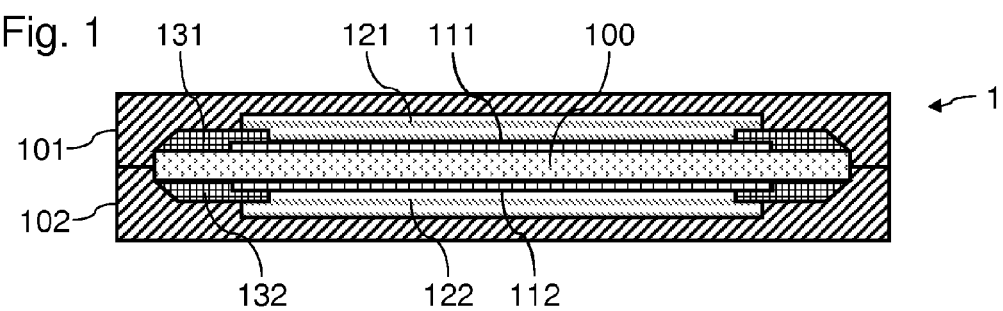
FIG. 1 is a view in schematic section of an example of a fuel cell.

FIG. 1 is a view in schematic section of an example of a fuel cell 1 including a membrane/electrode assembly manufactured according to one example of a method according to the invention. The fuel cell 1 is of a proton-exchange membrane or polymer electrolyte membrane type. Although it is not illustrated, the fuel cell 1 can comprise several superimposed cell units. The fuel cell 1 comprises a source of fuel feeding an inlet of each cell with molecular hydrogen. The fuel cell 1 also comprises a source of air feeding an inlet of each cell with air containing oxygen used an oxidant. Each cell unit also comprises exhaust channels. Each cell unit can also have a cooling circuit in a manner known per se.

Each cell unit comprises a membrane/electrode assembly or MEA. Each memory/electrode assembly comprises a layer of electrolyte formed for example by a polymer membrane 100.

The membrane/electrode assembly also comprises a cathode 111 and an anode 112 placed on either side of the membrane 100 and fixed on this membrane 100.

The layer of electrolyte forms a semi-permeable membrane 100 enabling proton conduction while at the same time being impermeable to the gases present in the cell. The membrane 100 also prevents passage of the electrons between the anode 112 and the cathode 111.

Each cell unit has flow guiding plates 101 and 102 positioned so as to respectively face the cathode 111 and the anode 112. Each cell unit has a gas diffusion layer 121 positioned between the cathode 111 and the guiding plate 101. Each cell unit also has a gas diffusion layer 122 positioned between the anode 112 and the guiding plate 102. Two guiding plates of adjacent cell units can form a bipolar plate in a manner known per se. The guiding plates can be formed by metal sheets comprising a surface in relief defining flow channels.

In a manner known per se, during the working of the fuel cell 1, air flows between the MEA and the guiding plate 101 and molecular hydrogen flows between the MEA and the guiding plate 102. At the anode 112, molecular hydrogen is ionized to produce protons that pass through the MEA. The electrons produced by this reaction are collected by the guiding plate 101. The electrons produced are then applied to an electrical load connected to the fuel cell 1 to form an electric current. At the cathode 111, oxygen is reduced and reacts with the protons to form water. The reactions at the anode and the cathode are governed as follows:

$H_2 \rightarrow 2H^+ + 2e^-$ at the level of the anode;
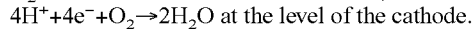
$4H^+ + 4e^- + O_2 \rightarrow 2H_2O$ at the level of the cathode.

During its operation, a cell of the fuel cell usually generates a DC voltage between the anode and the cathode of the order of 1V.

The invention proposes a method for manufacturing a membrane/electrode assembly. The invention proposes to form an electrode by deposition of an electrocatalyst ink on a support, comprising for example a pre-cut outline. The support and the electrode are fixedly attached by adhesion to the membrane. The part of the support which is inside the pre-cut contour or outline is separated from the rest of the support and the electrode.

Thus, the handling of the electrode as well as the number of steps of adhesion during the method of manufacture are limited, thus both reducing the cost of such a method and limiting the deterioration of the membrane and/or the electrode.

FIGS. 2 to 8 illustrate different steps of the manufacture of a membrane/electrode assembly according to one example of a method according to the invention. The method described with reference to FIGS. 2 to 8 could be implemented to fixedly attach to the membrane 100, the support 131 and the cathode 111 and/or the support 132 and the anode 112.

Figure 2:
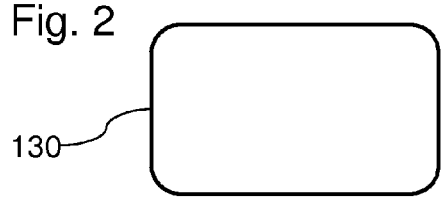
FIG. 2 is a top view of a support at the end of a first step of a method of manufacture.

FIG. 2 is a top view of a provided support 130. The support 130 is advantageously flat.

Figure 3:
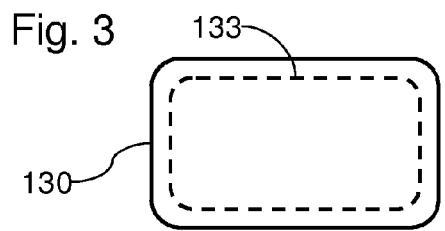
FIG. 3 is a top view of a support at the end of a second step of the method of manufacture.

FIG. 3 is a top view of the support 130 after the making of a pre-cut outline 133. The pre-cut outline 133 thus separates the support 130 between a peripheral border and a median part. The pre-cut outline 133 can be made on one face of the support 130, the other face of the support 130 being smooth.

Figure 4:
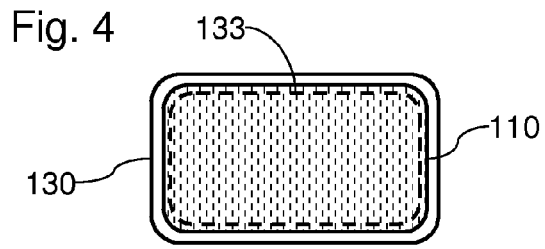
FIG. 4 is a top view of a support at the end of a third step of the method of manufacture

FIG. 4 is a top view of the support 130 after the deposition of an electrocatalyst ink in liquid phase, intended to form an electrode 110 after drying. The electrode 110 can be solidified by any appropriate means. The step for solidifying the electrocatalyst ink can implement a drying operation intended to prompt the evaporation of the solvent. Any method for drying known per se can be used, especially by means of an oven or a flow of hot air. In the example illustrated, the electrode 110 formed extends beyond the pre-cut outline 133. In the example illustrated, the formed electrode 110 is retracted from the edge of the support 130.

Figure 5:
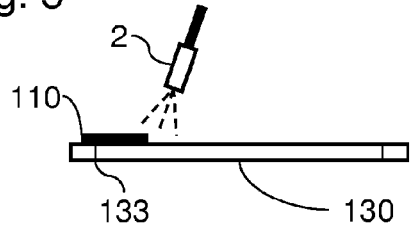
FIG. 5 is a side view of the support during the implementation of the third step.

As illustrated in FIG. 5, the deposition of electrocatalyst ink on the support 130 can be done according to an inkjet method, for example by means of a nozzle 2. The electrocatalyst ink can also be deposited by any other appropriate means, for example by coating. During the deposition of electrocatalyst ink, the support 130 is kept substantially horizontal.

Figure 6:
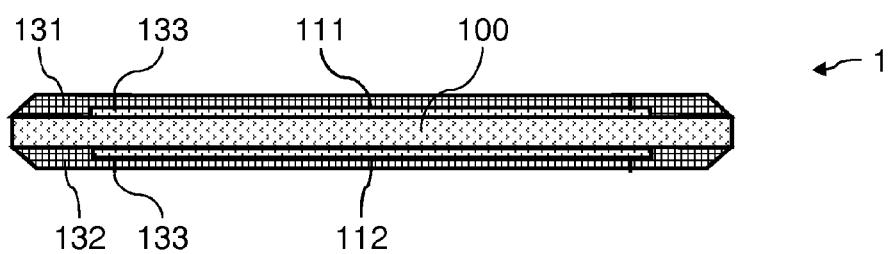
FIG. 6 is a side view in section of a fuel cell during a fourth step of a method of manufacture.

FIG. 6 is a view in section of a cell unit of a fuel cell 1 formed by using a support 131 and a cathode 111, as well as a support 132 and an anode 112 obtained according to the steps illustrated in FIGS. 2 to 5. At this step of the manufacturing process, a membrane/electrode assembly is made by fixedly attaching firstly the support 131 and the cathode 111 to one face of the membrane 100 and secondly the support 132 and the anode 112 to another face of the membrane 100.

The fixed attachment is achieved by adhesion of the support 131 and of the cathode 111 to one face of the membrane 100 and by adhesion of the support 132 and the anode 112 to the other face of the membrane 100. Since a support and an electrode are fixedly attached to the membrane 100 in one and the same step, the membrane/electrode assembly undergoes less handling and therefore less deterioration. In particular, the adhesion of the support 131 and of the cathode 111 to the membrane 100 can be achieved during a same hot-pressing step. Similarly, the adhesion of the support 132 and of the anode 112 to the membrane 100 can be achieved during a same hot-pressing step. A same hot-pressing step can even be used for the adhesion of the support 131 and of the cathode 111 to the membrane 100 and for the adhesion of the support 132 and of the anode 112 to the membrane 100.

At the end of this step, the cathode 111 is interposed between the membrane 100 and the support 131 and the anode 112 is interposed between the membrane 100 and the support 132. The support 131 and the support 132 respectively cover the cathode 111 and the anode 112. The supports 131 and 132 on which the cathode 111 and the anode 112 are formed thus serve as reinforcements for the membrane/electrode assembly, reinforcing its mechanical strength and facilitating its handling for the rest of the manufacturing process.

Figure 7:
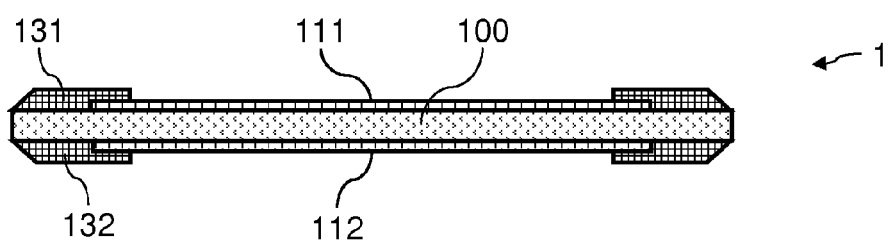
FIG. 7 is a side view in section of a fuel cell during a fifth step of a method of manufacture.

FIG. 7 is a view in section of the cell of a fuel cell 1 after the withdrawal of a part of the supports 131 and 132 respectively. The withdrawal of these parts of the supports 131 and 132 makes it possible to uncover respectively the median part of the cathode 111 and the median part of the anode 112. Thus, the median part of the support 131 and the median part of the support 132 situated inside the pre-cut outline 133 is removed. The withdrawal of a median part of the support 130 without deterioration to the electrode 110 is facilitated by the presence of the pre-cut outline 133.

Advantageously, at the end of this withdrawal step, the supports 131 and 132 can be subject to through holes cut out on their periphery, for example to make passages for the flow of gas or cooling liquid. In withdrawing the supports 131 and 132 subsequently to these cutting-out operations, the electrodes 111 and 112 remain protected by the supports 131 and 132 during the cutting-out operations.

Figure 8:
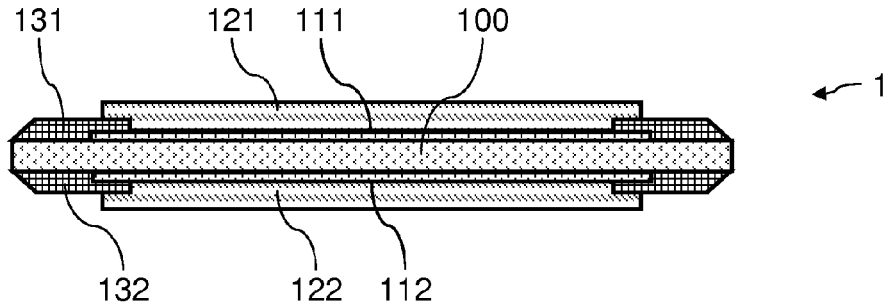
FIG. 8 is a side view in section of a fuel cell during a sixth step of a method of manufacture.

FIG. 8 is a view in section of the cell unit of a fuel cell 1 after the positioning of the gas diffusion layers 121 and 122. The gas diffusion layer 121 is thus placed in contact with the uncovered part of the cathode 111. The periphery of the gas diffusion layer 121 covers at least a part of the support 131 in this example. The gas diffusion layer 122 is placed in contact with the uncovered part of the anode 112. The periphery of the gas diffusion layer 122 covers at least one part of the support 132 in this example.

To obtain the fuel cell unit 1 illustrated in FIG. 1, the membrane/electrode assembly provided with gas diffusion layers 121 and 122 can then be included between two metal flow guiding plates 101 and 102.

Figure 9:
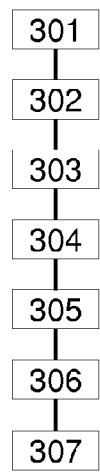
FIG. 9 is a flow chart of the different steps of the method of manufacture

FIG. 9 is a timing diagram used to list the different steps carried out in a method according to one example of implementation of the invention.

During the step 301, a support 130 is provided.
During the step 302, a pre-cut outline 133 is made in the support 130.
During the step 303, electrocatalyst ink is deposited on one face of the support 130.
During the step 304, the support 130 and the formed electrode 110 are fixedly attached by adhesion to a proton-exchange membrane 100.
During the step 305, a part of the support 130 is withdrawn so as to uncover the median part of the electrode 110.
During the step 306, a gas diffusion layer is positioned against the uncovered median part of the electrode 110.
During the step 307, the membrane/electrode assembly formed is included between two flow guiding plates.

The support 130 advantageously has an interface energy at least equal to 20 mN/m, preferably at least equal to 25 mN/m, and optimally at least equal to 30 mN/m. Such values of interface energy foster the adhesion of the support to the membrane 100 by hot pressing. The support 130 advantageously has interface energy lower than or equal to 60 mN/m, preferably at most 50 mN/m. Such values of interface energy reduce the adhesion between the support 130 and the electrode 110, thus facilitating the withdrawal of the median part of this support.

The support 130 advantageously includes a polymer, the glass transition temperature tg of which is higher than the hot-pressing temperature as the case may be. This glass transition temperature is advantageously higher than the hot-pressing temperature by at least 30° C. and preferably by at least 40° C. The use of such glass transition temperatures limits changes in the dimensions of the support 130 during the hot-pressing process. This glass transition temperature will advantageously be at least equal 120° C.

The face of the support 130 which is to receive a deposit of electrocatalyst ink, advantageously has a roughness smaller than or equal to 2 μm, preferably smaller than or equal to 1 μm so as to favor homogeneity of the composition and the thickness of the electrode formed by this deposition, and so as to limit adhesion with the electrode formed by this deposit.

In order to facilitate the withdrawal of the median part of the support 130 during a subsequent step, and in order to limit the risks of deterioration of an electrode formed during a subsequent step, the pre-cut contour 133 advantageously has individualized recesses spaced out by less than 1 mm. Other pre-cutting patterns can of course be made, for example in the form of a continuous groove by which a local thinning is obtained in the support 130.

Advantageously, the formed electrode 110 extends on the peripheral border of the support 130. Thus, the supporting border 130 is superimposed on the periphery of the electrode 110 and favors the fixed attaching of the electrode 110 to the membrane 100 during the withdrawal of the median part of the support 130.

The electrocatalyst ink deposited on the support 130 advantageously includes an electrocatalyst material and a product polymerisable or polymerized into a proton-conducting polymer. The polymerisable product is to get solidified to provide a certain degree of mechanical resistance to the electrode 110 and also optimizes the spread of water and ions up to the electrocatalytic material when the electrode is assembled with the fuel cell 1. The electrocatalyst ink can for example be dried by placing it in surroundings at a temperature of 50 to 150°.

An electrode 110 thus formed advantageously has a thickness of 2 to 20 μm, and preferably from 5 to 10 μm.

The electrocatalytic material has catalytic properties adapted to the catalyst reaction to be achieved. The electrocatalyst material can take the form of particles or nano-particles including metal atoms. The catalyst material can especially comprise metal oxides. In its formulations mentioned later on, the electrocatalytic material is iridium oxide. Metals such as platinum, gold, silver, cobalt, platinum, ruthenium, can also be used.

To limit adhesion between the electrocatalyst ink and the support 130, the deposited ink advantageously comprises a surface tension greater than the energy at the interface of the support 130.

As the case may be, the ionomer of the formed electrode 110 advantageously has a glass transition temperature tg below the hot pressing temperature. The glass transition temperature of the electrode 110 could range from 95 to 110° C. The electrode 110 could include an ionomer commercially distributed under the reference Nafion. Certain compositions of such an ionomer comprise a glass transition temperature of 100° C.

To foster the adhesion of the electrode 110 to the membrane 100 during a hot-pressing step, the membrane 100 and the electrode 110 advantageously comprise a same polymer material. This polymer material advantageously has a glass transition temperature lower than the hot-pressing temperature. The polymerizable material used to form this polymer material could be the ionomer commercially distributed under the commercial reference Nafion DE2020.

For adhesion for example by hot pressing, the hot-pressing temperature is advantageously from 100 to 180° C., and preferably from 120 to 140° C.

Although the method described makes use of a step for removing a part of the support corresponding to a pre-cut outline, the electrode can be formed on a support 130 without any pre-cut outline, the support 130 being cut out integrally after the formation of the electrode 110.

Although the example described illustrates the manufacture of a membrane/electrode assembly integrated into a fuel cell, the invention can be applied of course also to the integration of such an assembly into an electrolysis device.

The invention claimed is:

1. A method for manufacturing a membrane/electrode assembly, comprising the steps of:
   depositing an electrocatalyst ink on one face of a support so as to form an electrode on the support;
   fixedly attaching the support and the electrode formed on a proton-exchange membrane by adhesion; and
   withdrawing a part of the support so as to uncover at least one median part of the formed electrode.

2. The method for manufacturing a membrane/electrode assembly according to claim 1, wherein the step for depositing electrocatalyst ink comprises the depositing of an ink including an electrocatalyst material and a product polymerizable into a proton-conducting polymer.

3. The method for manufacturing a membrane/electrode assembly according to claim 1, wherein said support on which the electrocatalyst ink is deposited comprises a pre-cut outline.

4. The method for manufacturing a membrane/electrode assembly according to claim 3, wherein the precut outline comprises individualized recesses spaced out by less than one millimeter.

5. The method for manufacturing a membrane/electrode assembly according to claim 1, wherein the step for withdrawing the part of the support is done so that the part of the support remaining fixedly attached to the membrane covers the periphery of said electrode.

6. The method for manufacturing a membrane/electrode assembly according to claim 1, wherein the step of fixed attachment of the support and of the formed electrode includes the adhesion by hot pressing of the support and of the electrode to the proton-exchange membrane.

7. The method for manufacturing a membrane/electrode assembly according to claim 6, wherein said support is a material having a glass transition temperature higher by at least 30° C. than the hot-pressing temperature.

8. The method for manufacturing a membrane/electrode assembly according to claim 2, wherein the hot-pressing temperature is higher than the glass transition temperature of the polymerized material included in the electrode.

9. The method for manufacturing a membrane/electrode assembly according to claim 8, wherein the membrane comprises a polymerized material identical to the polymerized material of the electrode.

10. The method for manufacturing a membrane/electrode assembly according to claim 1, wherein the support on which said electrocatalyst ink is deposited has a surface energy at least equal to 20 J/m$^2$ and at most equal to 60 J/m$^2$, preferably ranging from 30 to 50 J/m$^2$.

11. The method for manufacturing a membrane/electrode assembly according to claim 1, wherein the support on which said electrocatalyst ink is deposited has a roughness lower than or equal to 2 μm, preferably lower than or equal to 1 μm.

12. The method for manufacturing a membrane/electrode assembly according to claim 1, wherein the step for withdrawing said part of the support is preceded by a step for cutting out through holes at the periphery of said support.

13. The method for manufacturing a membrane/electrode assembly according to claim 1, further comprising the placing of a gas diffusion layer in contact with said uncovered part of the electrode.

14. The method for manufacturing a membrane/electrode assembly according to claim 1, comprising a step of inclusion of the membrane to which said electrode and said support are fixedly attached between two flow guiding metal plates.

\* \* \* \* \*